United States Patent
Choi et al.

(10) Patent No.: US 8,688,854 B2
(45) Date of Patent: Apr. 1, 2014

(54) MESSENGER NOTIFICATION SYSTEM AND METHOD USING SYNCHRONIZATION SERVER

(75) Inventors: Sung-Wone Choi, Seoul (KR); Hyoung-Jung Kim, Seoul (KR)

(73) Assignee: NHN Corporation, Kyunggi-Do (KR)

( * ) Notice: Subject to any disclaimer, the term of this patent is extended or adjusted under 35 U.S.C. 154(b) by 1581 days.

(21) Appl. No.: 11/967,342

(22) Filed: Dec. 31, 2007

(65) Prior Publication Data

US 2008/0101561 A1 May 1, 2008

Related U.S. Application Data

(63) Continuation of application No. PCT/KR2006/002539, filed on Jun. 29, 2006.

(30) Foreign Application Priority Data

Jul. 8, 2005 (KR) ........................ 10-2005-0061643

(51) Int. Cl.
*G06F 15/16* (2006.01)

(52) U.S. Cl.
USPC .......................................... 709/232; 709/206

(58) Field of Classification Search
USPC .................. 709/206, 224, 232, 248; 714/2
See application file for complete search history.

(56) References Cited

U.S. PATENT DOCUMENTS

| | | | | |
|---|---|---|---|---|
| 5,951,652 | A * | 9/1999 | Ingrassia et al. | 709/248 |
| 2002/0021307 | A1 * | 2/2002 | Glenn et al. | 345/753 |
| 2004/0044736 | A1 * | 3/2004 | Austin-Lane et al. | 709/206 |
| 2004/0111490 | A1 * | 6/2004 | Im et al. | 709/218 |
| 2005/0038848 | A1 * | 2/2005 | Kaluskar et al. | 709/201 |

FOREIGN PATENT DOCUMENTS

| | | |
|---|---|---|
| JP | 2002-007296 | 1/2002 |
| JP | 2002-082862 | 3/2002 |
| JP | 2003-526989 | 9/2003 |
| JP | 2005-070921 | 3/2005 |
| JP | 2005-135216 | 5/2005 |
| KR | 10-2002-16078 | 3/2002 |
| KR | 10-2000-76037 | 9/2002 |
| KR | 10-2003-34488 | 5/2003 |
| KR | 10-2004-75412 | 8/2004 |
| KR | 10-2005-53398 | 6/2005 |

* cited by examiner

*Primary Examiner* — Brian J Gillis
(74) *Attorney, Agent, or Firm* — Harness, Dickey & Pierce, P.L.C.

(57) ABSTRACT

Provided are messenger notification system and method using a synchronization server. The system includes a messenger service system controlling transmission of instant messages of messenger users and monitoring and transmitting messenger users' status change information; at least one external service system monitoring whether a predetermined event occurs and creating a notification message indicating the occurrence of the event when the event occurs; and a synchronization server receiving the messenger users' status change information from the messenger service system, storing the received status change information in an online user database, determining whether a user to receive the notification message is online when receiving the notification message from the at least one external service system, transmitting the notification message to the messenger service system to send the notification message to the online user when the user is online.

19 Claims, 9 Drawing Sheets

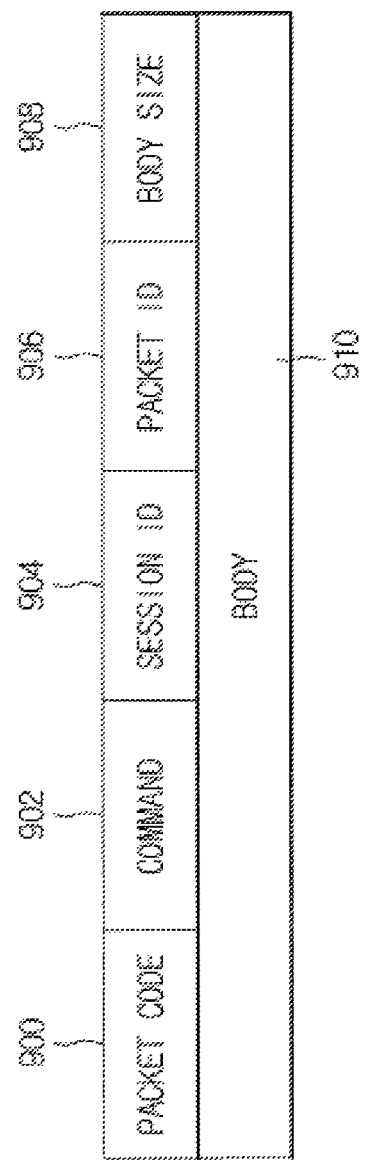

MESSENGER NOTIFICATION SYSTEM AND METHOD USING SYNCHRONIZATION SERVER

CROSS-REFERENCE TO RELATED APPLICATION

This application is a continuation of prior International Application PCT Application No. PCT/KR2006/002539 filed on Jun. 29, 2006, which claims the benefit of priority from Korean Patent Application No. 10-2005-0061643 filed on Jul. 8, 2005. The disclosures of International Application PCT Application No. PCT/KR2006/002539 and Korean Patent Application No. 10-2005-0061643 are incorporated herein by reference.

BACKGROUND OF THE INVENTION

1. Field of the Invention

The present invention relates to a messenger notification system, and more particularly, to a system for notifying event occurrence information using an instant messenger.

2. Description of Related Art

With increasing use of instant messengers for transmitting and receiving instant messages, the instant messengers have served as significant communication means along with telephones or mobile phones. Since the instant messengers transmit messages in computer systems, the instant messengers can easily transmit and receive document files and image files in real time, in addition to typical text messages.

Particularly, it is general that the instant messengers are always online at offices or the like. As a result, the instant messengers have become most popular communication means along with cellular phones.

With the increasing use of the instant messengers, it has been attempted to enlarge the allowable range of the instant messengers. Such services for allowing parties to a dialogue to play a game or providing useful information such as news and shopping information in real time using the instant messengers are now put into practice.

Since a messenger is communication means which is always online, it is useful for providing a notification service such as a short message service of a cellular phone. However, the notification service using a messenger is not widely used due to a problem with a server load and thus the notification service is provided only within a much restricted allowable range like E-mail.

In recent years, portal sites provide a variety of services such as an E-mail service, a private homepage service, a blog service, and a community service. However, since it causes rapid increase in server load to provide notification messages of all the events occurring in the services by means of the instant messengers, it is difficult in practice to embody the notification service.

BRIEF SUMMARY OF THE INVENTION

In order to solve the above-mentioned problems, the present invention suggests a system and a method for notifying events occurring in a variety of services by means of an instant messenger while minimizing a server load.

The invention also suggests a messenger notification system using a synchronization server which can minimize the amount of notification message packets by transmitting a notification message only to instant messenger online users.

According to an aspect of the invention, there is provided a messenger notification system comprising: a synchronization server configured for receiving status change information of a messenger user from a messenger service system and for receiving a notification message from at least one external service system; and an online user database for storing information of the messenger user in response to status change information of the messenger user received by said synchronization server. The synchronization server is configured to selectively transmit the notification message dependent upon the status of the messenger user stored in said online user database. The status change information includes online/offline status of the messenger user and the notification message is indicative of an event occurred in an external service system The synchronization server may determine whether a user to receive the notification message is online on the basis of the information stored in the online user database when receiving the notification message from the external service system, and may transmit the notification message to the instant messenger service system to send the notification message to the instant messenger online user when it is determined that the user to receive the notification message is online.

The external service system may monitor whether a predetermined event occurs and may create the notification message indicating the occurrence of the event when the event occurs.

The external service system may include one or more of a mail service system, a blog service system, and a community service system.

When the external service system is the mail service system, the event may be a mail reception event and when the external service system is the blog or community services system, the event may be a new text registration event.

When the synchronization server or the online user database is out of order, the synchronization server may transmit entire online user request information to the instant messenger service system and the instant messenger system may provide the entire online user information to the synchronization server.

When the instant messenger service system is reset, the instant messenger service system may transmit reset information of the instant messenger service system to the synchronization server and the synchronization server may update the online user database.

The synchronization server may include a socket for communication with a predetermined server of the instant messenger service system and a predetermined server of the external service system and may transmit and receive a packet using a socket communication method.

Status change information of a messenger user packet transmitted to the synchronization server from the instant messenger system and a notification message packet transmitted to the synchronization server from the external service system may include a packet code field, a command field, a session ID field, a packet ID field, a body size field, and a body field.

The synchronization server may convert and then transmit a protocol of the notification message packet to the instant messenger service system.

The conversion of protocol may include converting a parameter recorded in the command field into a parameter suitable for the respective systems.

The synchronization server may include: at least one first socket for communication with the external service system; a second socket for communication with the messenger service system; a status information updating module configured for updating status information of the online user database upon receipt of the status change information of the messenger user from the messenger service system; and an online user determination module configured for determining whether the user associated with the notification message is online upon receipt of the notification message from the external service system. The second socket receives the status change information of the messenger user from the messenger service system and provides the received status change information to the status information updating module. The first socket receives the notification message from the external service system and the second socket provides the notification information of the event occurrence to the messenger service system when the online user determination module determines that the given user of the notification message is online.

According to another aspect of the invention, there is provided a notification service providing method using an instant messenger, the method being executed by a synchronization server, the method comprising the steps of: (a) receiving status change information of a messenger user from a messenger service system; (b) updating an online user database in response to said received status change information of the messenger user; and (c) selectively transmitting a notification message received from at least one external service system dependent upon the status of the messenger user stored in said updated online user database. The notification message is indicative of an event occurred in the external service system. The status change information includes online/offline status of the messenger user.

According to another aspect of the invention, there is provided a notification service providing system for notifying an event occurring in an external service system using a instant messenger service system, the system comprising: at least one first socket for communication with the external service system; a second socket for communication with the instant messenger service system; a status information updating module updating status information of an online user database when receiving status change information of the messenger user from the instant messenger service system; and an online user determination module determining whether a user corresponding to a notification message is online when receiving the event occurrence notification message from the external service system.

According to another aspect of the invention, there is provided a notification service providing method using a messenger in a system including an instant messenger service system, a synchronization server, and at least one external service system, the method comprising the steps of: monitoring a presence status of a messenger user; transmitting change of the presence status of the messenger user to a synchronization server; updating an online user database based upon the transmitted messenger user's status change information; transmitting a notification message associated with a predetermined event to the synchronization server when the predetermined event occurs in an external service system; determining whether the user associated with the transmitted notification message is online based upon the messenger user's status information stored in the online user database; and transmitting the notification message to the messenger user. The presence status includes online/offline status of the messenger user.

BRIEF DESCRIPTION OF THE DRAWINGS

FIG. 9 is a diagram illustrating a structure of a packet transmitted to the synchronization server from the messenger center server or an external server.

DESCRIPTION OF EXEMPLARY EMBODIMENTS

Figure 1:
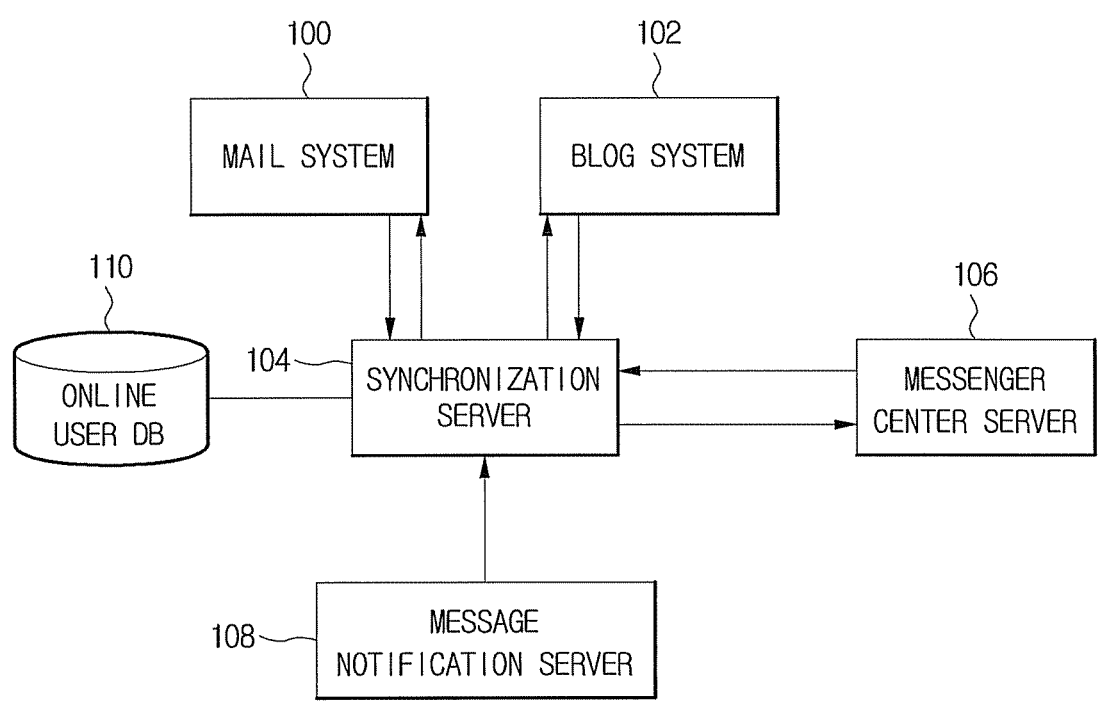
FIG. 1 is a diagram illustrating the whole configuration of a messenger notification system using a synchronization server according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "module" and "system" are intended to refer to a computer-related entity, either hardware, a combination of hardware and software, software, or software in execution. For example, a module can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more modules can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

Hereinafter, messenger notification system and method using an instant messenger according to exemplary embodiments of the invention will be described in detail with reference to the attached drawings.

FIG. 1 is a diagram illustrating the whole configuration of a messenger notification system using a synchronization server according to an exemplary embodiment of the present invention.

Referring to FIG. 1, a notification system using a messenger according to an exemplary embodiment of the invention includes a synchronization server 104 and an online user database 110.

The notification system performs a function of notifying an event occurring in an external service system such as a mail service system and a blog service system. Only a mail service system 100 and a blog service system 102 are shown in FIG. 1. Otherwise, it will be obvious to those skilled in the art that a variety of external service systems such as a community service system, a file storage service system, and private homepage service system can be provided.

The synchronization server 104 shown in FIG. 1 serves to receive information on an online or offline status of a specific user from a messenger center server 106 of the messenger service system and to store the received information in the online user database 110. When the user is changed to the online or offline status, the status change information is notified to the messenger center server 106. The messenger center server 106 transmits the received status change information to the synchronization server 104.

According to an exemplary embodiment of the invention, the synchronization server 104 performs a communication with the messenger center server 106 by the use of a socket and stores the status change information in the online user database 110 when receiving the status change information from the messenger center server 106 through the open socket. Accordingly, the synchronization server 104 can acquire information of users online in the messenger service system.

When a predetermined event occurs in an external service system such as a mail service system 100 and a blog service system 102 and a notification message is transmitted therefrom, the synchronization server 104 serves to determine whether a user corresponding to the received notification message is online. The synchronization server 104 determines whether the user corresponding to the received notification message is online on the basis of the information stored in the online user database 110. When the user corresponding to the notification message is an online user, the synchronization server 104 provides the notification message to the messenger center server 106.

According to an exemplary embodiment of the invention, the synchronization server 104 preferably performs the communication with a server of the mail service system 100 or a server (generally mail server) of the blog service system 102 (generally a blog server) by the use of a socket.

According to an exemplary embodiment, the mail service system 100 creates a notification message informing a specific user of the reception of a new mail and transmits the created notification message to the synchronization server 104 when the new mail arrives at the specific user. The mail service system 100 may support a function of transmitting the notification message only when a user receives a mail from a specific transmitter. In this case, the mail service system may create the notification message to be transmitted to the corresponding receiver only when the mail is transmitted from the corresponding transmitter.

According to an exemplary embodiment of the invention, the blog service system 102 creates a notification message informing a specific user of the registration of a new text and transmits the created notification message to the synchronization server 104 when the new text is registered in the specific user.

Not shown in FIG. 1, when a community service system is connected to the synchronization server and a new text is registered in a specific community, the community service system creates a notification message informing members of the specific community of the registration of the new text and transmits the created notification message to the synchronization server 104.

In addition to the events described above, it will be obvious to those skilled in the art that a variety of events can be set to the external service system such as the mail service system and the blog service system and a notification message can be transmitted.

According to the exemplary embodiment of the invention, when a notification message is transmitted from the external service system such as the mail service system and the blog service system, the synchronization server transmits only the notification message for the online users to the messenger service system. Accordingly, it is possible to reduce the number of messages to be transmitted in comparison with the known notification message transmitting method, thereby reducing the load of the messenger service system transmitting the notification message directly to the users. In the known art, there was a problem that notification messages for a variety of external service systems cannot be transmitted due to increase in notification message packets. However, since the invention can solve such a problem, the notification messages for events of a variety of services such as blogs and communities can be provided in addition to mails.

The messenger center server 106 is a server controlling the operation of transmitting an instant message as a whole and performs functions of managing accesses of messenger clients and processing messages and other requests transmitted from the messenger clients. According to an exemplary embodiment of the invention, the messenger center server 106 senses the change in status whenever a user's online/offline status information is changed and transmits the status change information to the synchronization server 104. The messenger center server 106 may transmit the user's online/offline status information to the synchronization server 104 in real time or may transmit the status change information at a predetermined interval of time.

The messenger center server 106 according to an exemplary embodiment of the invention controls operations of receiving an event notification message transmitted from the external service system from the synchronization server 104 and transmitting the event notification message to the user associated with the received event notification message.

The message notification server 108 serves to store message packets received from messenger clients in a queue and sequentially provide the stored message packets to the messenger center server 106. The message notification server 108 transmits to the messenger center server 106 information on log-off when a user logs off the messenger, in addition to the message packets.

Figure 2:
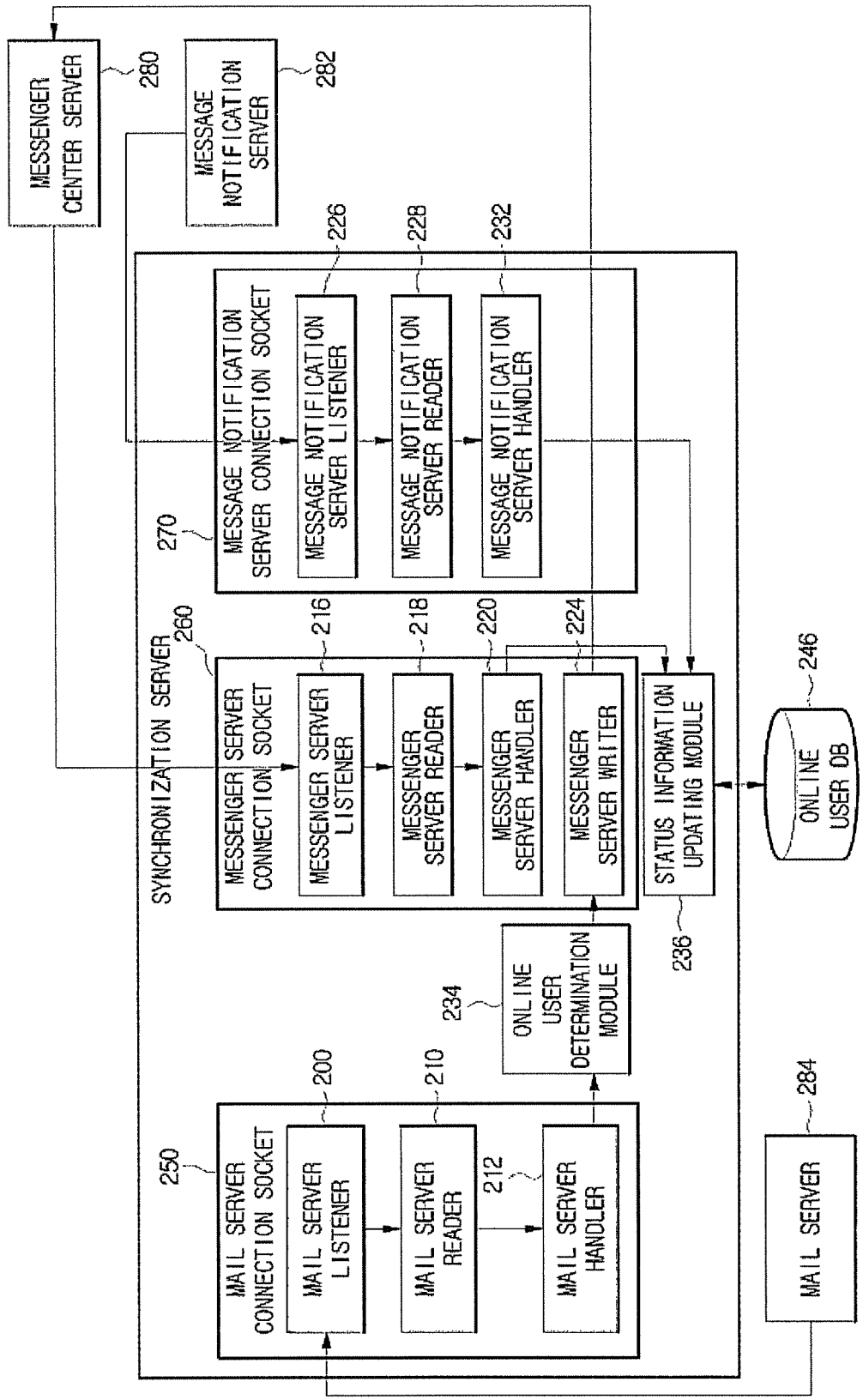
FIG. 2 is a block diagram illustrating a module configuration of the synchronization server according to an exemplary embodiment of the invention.

FIG. 2 is a block diagram illustrating a module configuration of the synchronization server according to an exemplary embodiment of the invention.

Referring to FIG. 2, the synchronization server according to an exemplary embodiment of the invention includes three connection sockets of a mail server connection socket 250, a messenger server connection socket 260, and a message notification server connection socket 270, an online user determination module 234, and a status information updating module 236.

As shown in FIG. 2, the respective sockets include a listener, a reader, a handler, and a writer. Although the respective connection sockets of the synchronization server do not include a queue, it will be obvious to those skilled in the art that a queue may be disposed between the listener and the reader of the respective connection sockets when the amount of packets increases.

Although it is shown in FIG. 2 that a communication between servers is performed using a socket, other inter-server communication methods may be used instead of the socket communication. For the purpose of convenient explanation, it is shown in the figure that the synchronization server and the mail server are connected to each other, but servers of a variety of external service systems may be connected as described above. In this case, connection sockets for connection to the servers of the external service systems may be further provided.

The mail server connection socket 250 serves to receive mail reception information for a specific user from the mail server 284 and transmit status change information of a specific user sent from the messenger center server 280 to the mail server.

When a mail is received by the mail server, the notification message associated with the reception of mail is received by a mail server listener 200 of the mail server connection socket 250. Generally, a listener serves to sense a connection to a node transmitting a message, receive packets transmitted from the node, and send the received packets to the reader. The mail server listener 200 monitors whether notification message packets are transmitted from the mail server 284 and sends the notification message packets to a mail server reader 210 when the notification message packets are received. When a queue is provided, the packets received by the listener may be stored in the queue in a FIFO manner by an additional writer.

According to an exemplary embodiment of the invention, the socket communication between the mail server listener and the mail server is performed by the use of a TCP protocol. However, it will be obvious to those skilled in the art that a UDP protocol may be used in the socket communication and the socket communication may be performed in a state where the connection is not set like a multicasting.

The mail server reader 210 serves to read out the packets received by the listener and send the read packets to the mail server handler 212.

When a notification message packet indicating the reception of a mail is transmitted from the mail server 284, the mail server handler 212 sends the notification message packet to the online user determination module 234. The online user determination module 234 determines whether a user corresponding to the notification message packet is online on the basis of the information stored in the online user database. When the user is online, the online user determination module 234 converts the protocol of the notification message packet and provides the notification message packet of the converted protocol to the messenger server writer 224. Since the mail service system and the messenger service system are different from each other in the communication methods, a process of converting a protocol is generally necessary. However, when both systems are not different from each other in parameter or communication method, the process of converting a protocol may not be necessary. More details of the process of converting a protocol will be described later. When the user corresponding to the notification message packet is not online, the online user determination module 234 does not perform the processes of converting a protocol and providing a packet and thus the notification message is not sent to the messenger service system.

According to another exemplary embodiment of the invention, the mail server handler 212 may receive information whether the user corresponding to the notification message packet is online by means of a communication with the online user determination module 234 and may directly perform the process of converting a protocol of the packet and the process of providing the packet of the converted protocol to the messenger server writer 224.

The messenger server connection socket 260 serves to receive the user's status change information transmitted from the messenger center server and send the notification message transmitted from the mail server to the messenger center server 280.

When the user's online/offline status information is changed, the messenger center server 280 transmits the user's status change information to the synchronization server 104 and the messenger server listener 216 of the synchronization server receives the status change information.

The messenger server listener 216 sends the received status change information to the messenger server reader 218. As described above, when the socket includes a queue, the messenger server listener 216 may store the packet in the queue by the use of the writer.

The messenger server reader 218 reads out the information received by the messenger server listener 216 and sends the read information to the messenger server handler 220.

When the packet sent from the messenger server relates to the user's status change information, the messenger server handler sends packet reception information to the status information updating module 236 and the status information updating module 236 serves to analyze the received packet and update the online user database.

The message notification server connection socket 270 receives the user's status change information along with the messenger server connection socket 260 and sends the received status change information to the online user database 246. The user's online/offline status information is managed by the messenger center server 280 and the user's offline information is primarily sent to the message notification server 282. The message notification server 282 primarily is a server serving to receive a message or other information transmitted from a user and to send the received information to the messenger center server 280. When a user is offline, the message notification server 382 sends the user's offline information to the messenger center server 280. The message notification server 282 also transmits the user's offline information to the synchronization server in the exemplary embodiment of the invention.

The user's offline information sent from the message notification server is received by the message notification server listener 226. The message notification server reader 228 reads the information received by the message notification server listener 226 and sends the read information to the message notification server handler 232.

The message notification server handler 232 sends to the status information updating module 236 the packet reception information indicating that the user is changed to the offline state. The status information updating module 236 analyzes the received packet and updates the online user database 246.

Since the message notification server need not receive the notification message or other messages from an external server such as the mail server, the message notification server socket may not include the writer unlike other sockets.

The message notification server socket is an assistant module provided to exactly send the user's status change information. It will be obvious to those skilled in the art that the advantages of the invention can be accomplished without the message notification server socket.

Figure 3:
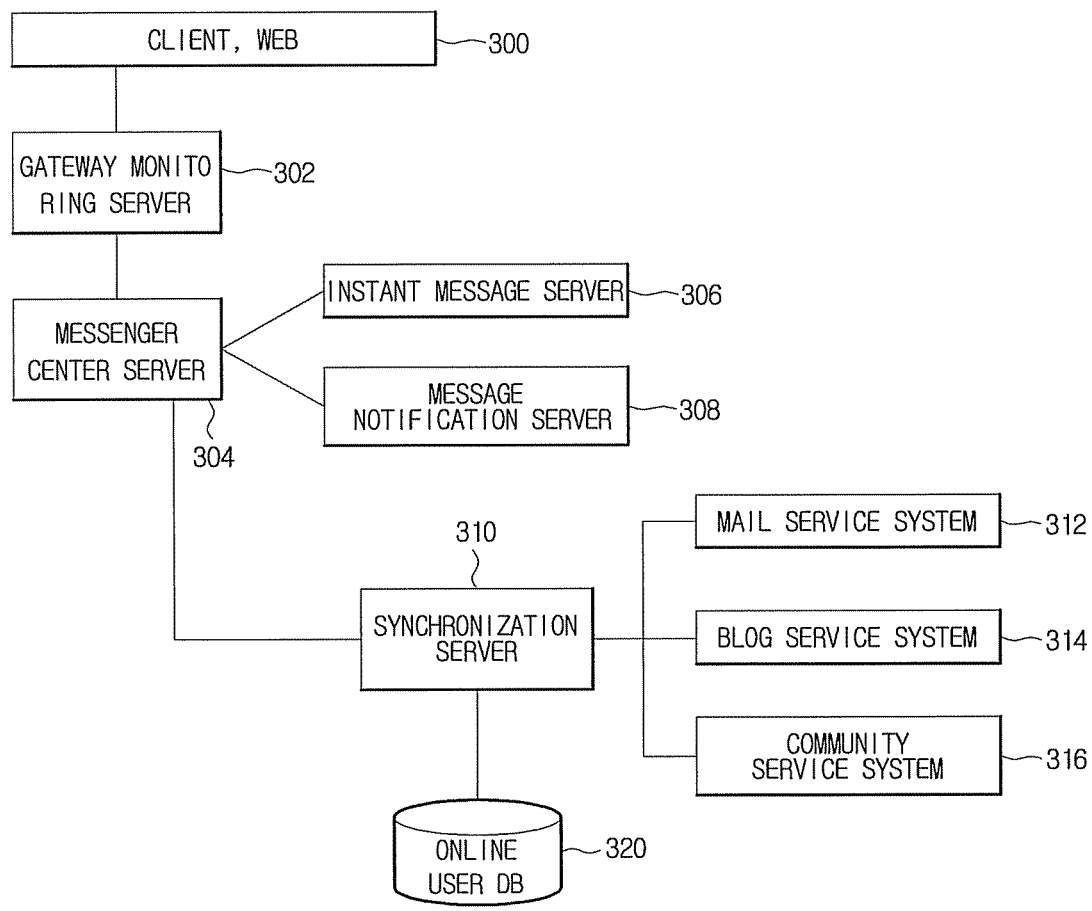
FIG. 3 is a diagram illustrating a connection between a messenger service system and the synchronization server according to an exemplary embodiment of the invention.

FIG. 3 is a diagram illustrating a connection between the messenger service system and the synchronization server according to an exemplary embodiment of the invention.

Referring to FIG. 3, a gateway monitoring server 302 receives a request for access to a messenger transmission system from messenger clients 300 through a web, processes the received request for connection, and sends address information of a center server, which a messenger client wants to access, to the messenger client. That is, when a user sends a request for access to change the offline status to the online status, the request information is transmitted to the gateway monitoring server 302. The user's access information processed by the gateway monitoring server 302 is sent to the messenger center server 304. The gateway monitoring server 302 manages the user's status information as well as the access information. For example, the gateway monitoring server receives from the messenger clients status information preset in the messenger program, such as IDLE or BUSY and manages the status information.

The messenger center server 304 is a server controlling the operation of transmitting an instant message as a whole and serves to manage accesses of the messenger clients and process messages and other requests transmitted from the messenger clients. When the gateway monitoring server 302 processes the request for access from a user, the messenger center server 304 transmits the user's access request to the synchronization server 310.

When a user is online and transmits and receives messages with another user, a message transmitted from the user is sent to the message notification server 308. The message notification server 308 maintains the socket connection to the online messenger clients, receives messages transmitted from the clients, and sequentially sends the received messages to the messenger center server 304. The messenger offline information indicating that a user is offline is sent to the message notification server 308. The message notification server sends the user's offline information to the messenger center server 304. The user's offline information may be managed by the gateway monitoring server instead of the message notification server.

The instant message server 306 manages instant messaging sessions between the messenger clients and relays message packets transmitted between the messenger clients. The instant message server 306 receives a message packet from the messenger center server and then transmits the received message packet to another user's messenger client to receive the packet.

The synchronization server 310 receives the user's online/offline information transmitted from the messenger center server and manages the information of the online users by the use of the online user database 320. The mail service system 312, the blog service system 314, and the community service system 316 are shown in FIG. 3, but it is as described above that the online/offline information may be sent to other service systems.

Figure 4:
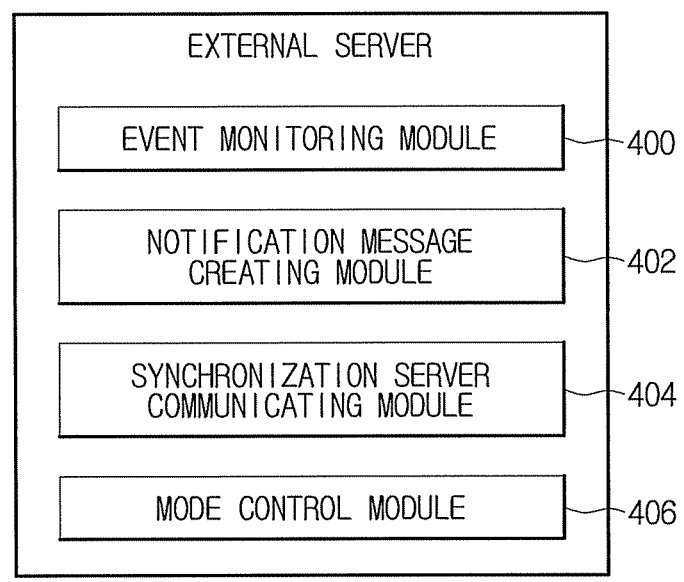
FIG. 4 is a diagram illustrating a module configuration of an external server communicating with the synchronization server according to an exemplary embodiment of the invention.

FIG. 4 is a diagram illustrating a module configuration of an external server communicating with the synchronization server according to an exemplary embodiment of the invention.

The external server may include a mail server, a blog server, and a community server. Only modules necessary to provide a notification service according to an exemplary embodiment of the invention are shown in FIG. 4, but modules necessary to provide other services are not shown therein.

Referring to FIG. 4, the external server for providing a notification service according to an exemplary embodiment of the invention includes an event monitoring module 400, a notification message creating module 402, a synchronization server communicating module 404, and a mode control module 406.

The event monitoring module 400 is a module monitoring whether a predetermined event of which a notification message should be notified occurs. When the external server is the mail server, the event monitoring module 400 performs an operation of determining whether a new mail is sent to a mail box. When the external server is the blog server, the event monitoring module 400 performs an operation of determining whether a new text is registered. In case of the mail server, the event monitoring module 400 can sense occurrence of an event that a new mail is received through a communication with a mail delivery agent (MDA) or a mail box. When sensing the occurrence of an event, the event monitoring module 400 sends event occurrence information to the notification message creating module 402.

The notification message creating module 402 creates a notification message for notifying the messenger service system of the occurrence of an event. The notification message can include a type of the event, a receiver of the notification message, and information to be sent relative to the event (information of a mail transmitter in case of a mail).

The synchronization server communicating module 404 transmits the created notification message through the synchronization server and the preset socket. The synchronization server communicating module 404 can receive from the synchronization server status information indicating that the messenger service system is out of order.

When the synchronization server communication module 404 receives the information indicating that the messenger service system is out of order from the synchronization server, the mode control module 406 switches the mode to a mode that the external server does not create the notification message. In the mode that the notification message is not created, the event monitoring module 400 and the notification message creating module 402 is deactivated and does not perform the transmission of the notification message until the messenger service system is in a normal status.

Figure 5:
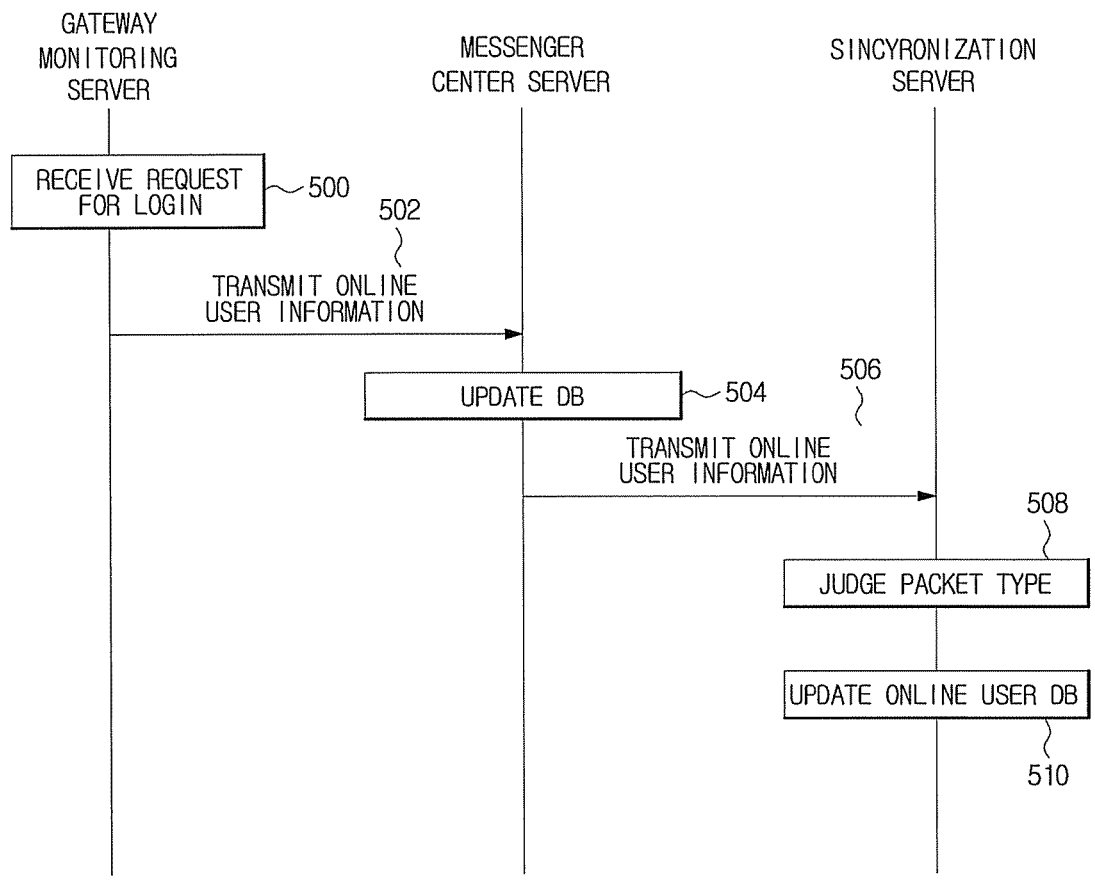
FIG. 5 is a diagram illustrating a flow of a procedure of providing a user's online information to the synchronization server when the user logs in a messenger according to an exemplary embodiment of the invention.

FIG. 5 is a diagram illustrating a flow of a procedure of providing a user's online information to the synchronization server when the user logs in a messenger according to an exemplary embodiment of the invention.

Referring to FIG. 5, when a user sends a request for logging in the messenger, the user's login request is transmitted to the gateway monitoring server of the messenger service system (step 500). The gateway monitoring server performs an authentication procedure for identifying an ID and a password and then transmits the user's online information to the messenger center server when the user is an authorized user (step S502).

The messenger center server updates the user's online information received from the gateway monitoring server through a communication with the database (step 504) and transmits the user's online information to the synchronization server (step 506). The user's online information transmitted to the synchronization server from the messenger center server is transmitted in the format of a predetermined protocol packet. An example of the packet structure is shown in FIG. 9.

FIG. 9 is a diagram illustrating a structure of a packet transmitted to the synchronization server from the messenger center server or an external server. Referring to FIG. 9, a protocol packet according to an exemplary embodiment of the invention includes a packet code field 900, a command field 902, a session ID field 904, a packet ID field 906, a body size field 908, and a body field 910.

In FIG. 9, information on a packet transmission method is recorded in the packet code field 900. For example, information on transmission methods such as uni-casting, multicasting, and broadcasting is recorded in the packet code field 900.

Information for identifying the packet type is recorded in the command field 902. For example, information for identifying a packet type used to transmit a user's online information or a packet type used to transmit a user's offline information is recorded in the command field 902.

Session information including a file indicator is recorded in the session ID field 904 and ID number information uniquely given to each packet is recorded in the packet ID field 906.

Size information of a body field used to sense erroneous transmission is recorded in the body size field 908 and detailed information necessary for each packet type is recorded in the body field 910. For example, in case of a packet for transmitting a user's online or offline information, ID information of the user can be recorded in the body field 910. In case of information for notifying a use's mail reception from the mail server, ID of a mail receiver and nickname information of a mail transmitter can be recorded in the body field 910.

The synchronization server receiving the user's online information from the messenger center server determines whether it is a packet for notifying a user's online information on the basis of command information of the packet (step 508). The synchronization server analyzes the packet, extracts online user information or the like, and reflects the extracted information in the user online database (step 510).

Figure 6:
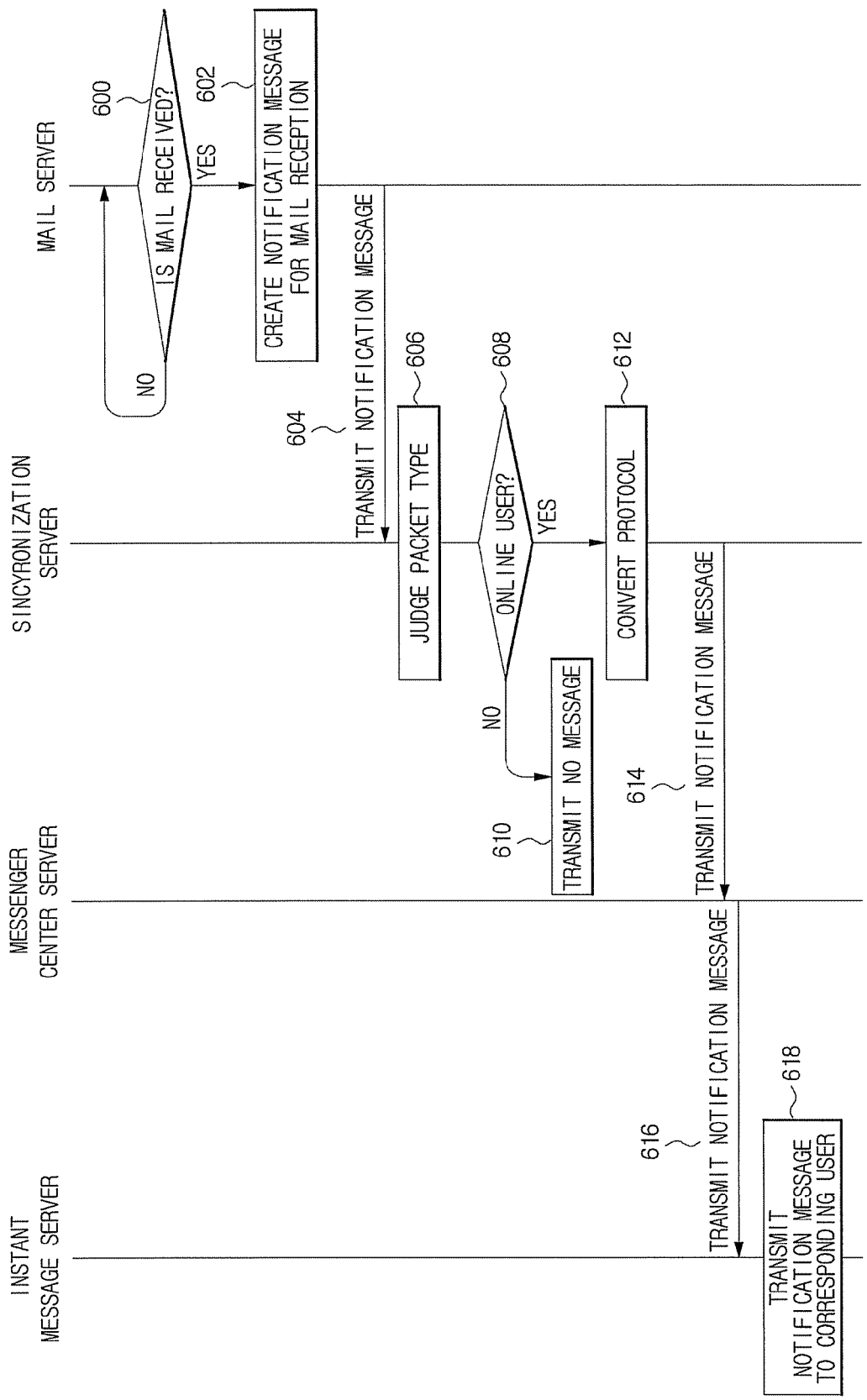
FIG. 6 is a diagram illustrating a flow of a procedure of providing mail reception information as a notification message in a mail server according to an exemplary embodiment of the invention.

FIG. 6 is a diagram illustrating a flow of a procedure of providing mail reception information as a notification message in the mail server according to an exemplary embodiment of the invention.

An example that the reception of a new mail is notified as a notification message to the messenger user is shown in FIG. 6.

Referring to FIG. 6, the mail server monitors whether a new mail is received (step 600). When a new mail is received, the mail server creates a notification message protocol packet of the format shown in FIG. 9 (step 602). The body field of the notification message packet can include ID information of the mail receiver and nickname information of the mail transmitter. The created notification message is transmitted to the synchronization server (step 604).

The synchronization server determines whether it is a packet for transmitting mail reception information on the basis of the identification information of the notification message packet, analyzes the packet, and extracts packet receiver information (step 606).

The synchronization server refers to the online user database to determine whether the packet receiver is online currently (step 608). When the packet receiver is not online, the synchronization server does not transmit the notification message to the messenger server (step 610).

When the packet receiver is online, the synchronization server converts the received notification message protocol packet into a protocol packet suitable for the messenger server (step 612).

According to an exemplary embodiment of the invention, preferably, the protocol conversion is performed such that only the command field of the packet is changed to a command suitable for the messenger server without changing the structure of the packet.

That is, since the command used in the mail server is different from the command used in the messenger server, the synchronization server performs the protocol converting operation of converting the command included in the command field of the packet into the command suitable for the messenger server.

The synchronization server transmits the converted notification message to the messenger center server (step 614). The messenger center server sends the notification message to the instant message server and instructs the instant message server to transmit the notification message to the corresponding user (step 616).

The instant message server analyzes the notification message packet received from the messenger center server and transmits the notification message to the corresponding user (step 618).

Figure 7:
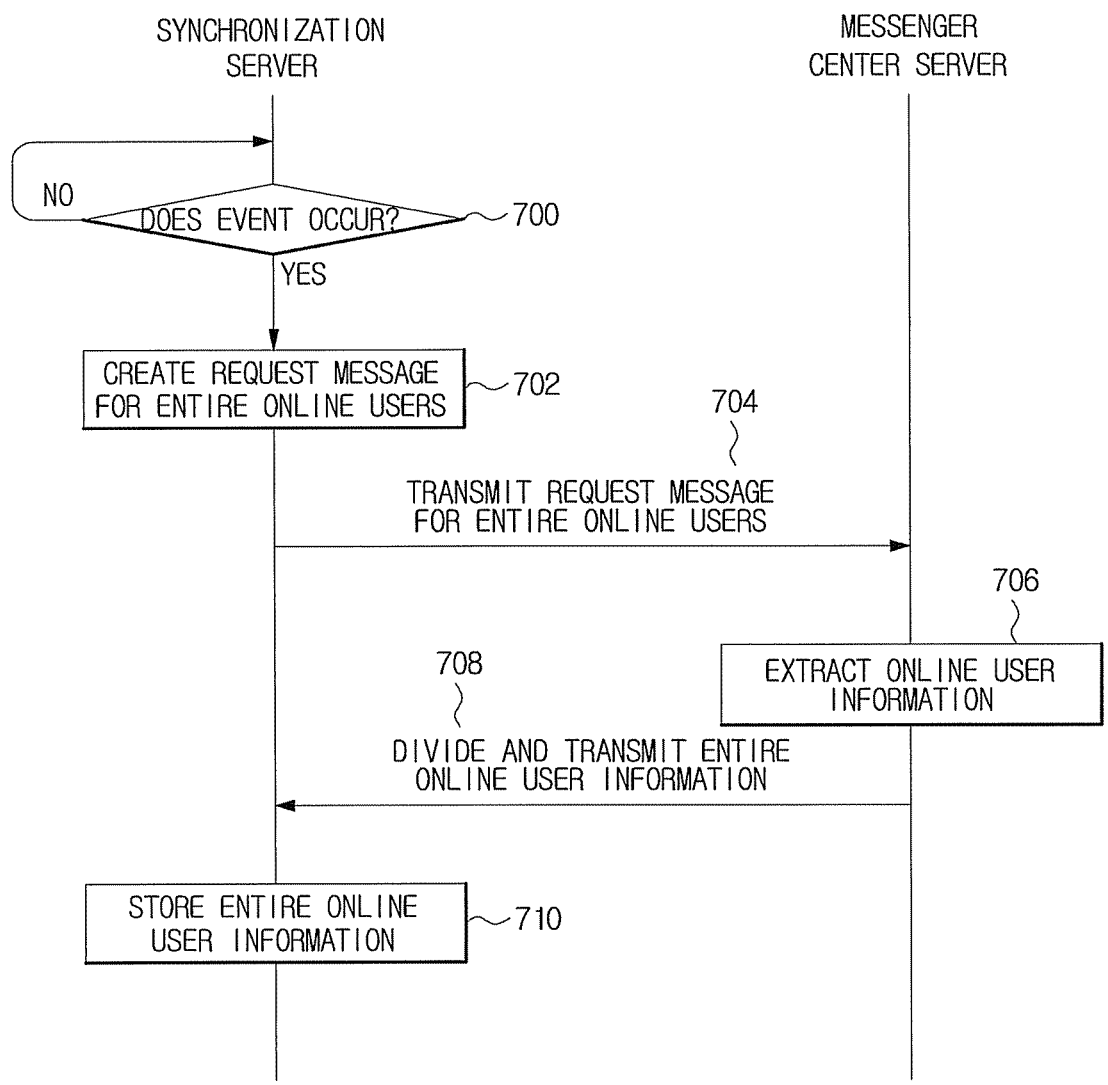
FIG. 7 is a diagram illustrating a flow of a restoration method when online user information managed by the synchronization server is lost due to disorder of the synchronization server or an online user database according to an exemplary embodiment of the invention.

FIG. 7 is a diagram illustrating a flow of a restoration method when the online user information managed by the synchronization server is lost due to disorder of the synchronization server or the online user database according to an exemplary embodiment of the invention.

When the synchronization server or the online user database is disorder due to the increase in load or the synchronization server is turned off for the purpose of upgrade or test, information of the entire online users should be acquired. FIG. 7 illustrates a flowchart of such a procedure.

Referring to FIG. 7, when an event such as server disorder or system upgrade occurs (step 700), the synchronization server creates a message requesting the messenger server for information of the entire online users (step 702) and transmits the created message to the messenger center server (step 704).

The messenger center server extracts the information of the entire online users from the database in response to the received request message (step 706). The messenger center server divides the information of the entire online users into predetermined units and transmits packets of the divided information units to the synchronization server (step 708).

The synchronization server analyzes the received packets and stores the information of the entire online users in the online user database (step 710).

Figure 8:
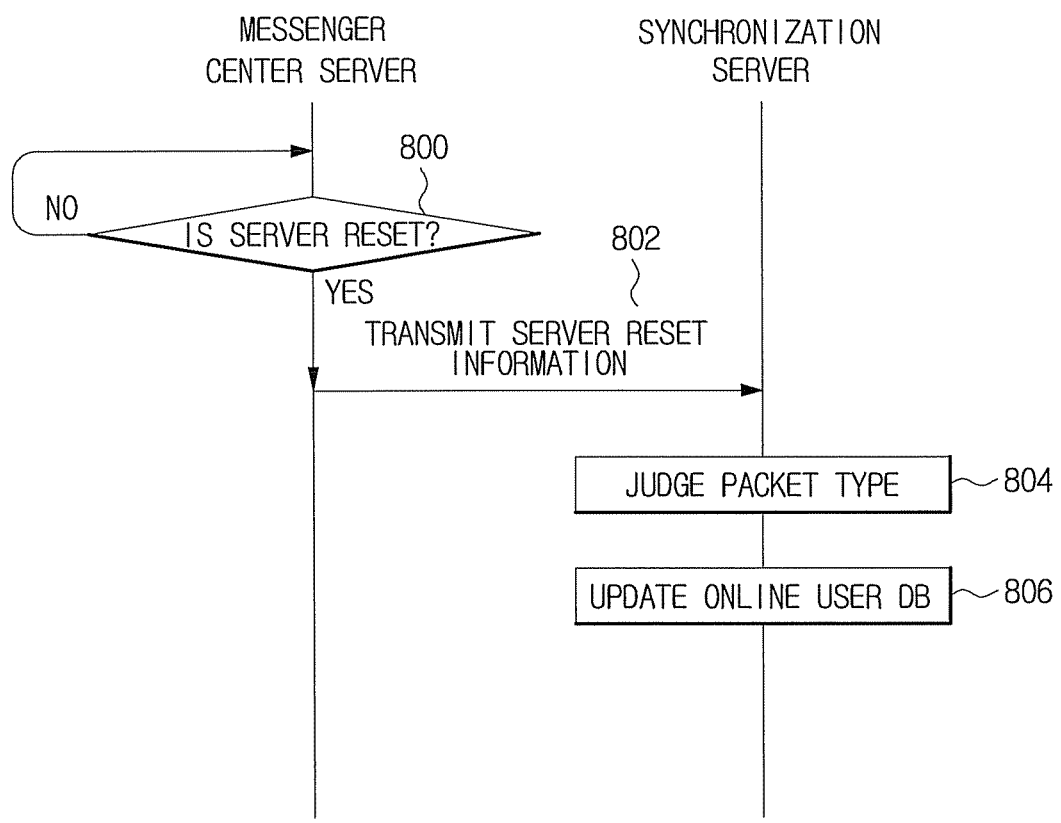
FIG. 8 is a diagram illustrating a flow of a procedure of providing messenger server reset information when the messenger service system is out of order.

FIG. 8 is a diagram illustrating a flow of a procedure of providing messenger server reset information when the messenger service system is out of order.

When the messenger server is reset, connections to all the online users are broken. Accordingly, it is more preferable that the synchronization server is allowed to update the information of the online users at a time by providing server reset information than that information of the offline users is individually transmitted to all the users.

Referring to FIG. 8, when the messenger service system is turned off for the purpose of upgrade of the messenger service system or the server is reset due to the disorder occurring in the messenger service system due to the increase in load (step 800), the messenger center server transmits the server reset information to the synchronization server (step 802).

The synchronization server analyzes the command field of the received packet to recognize that the packet is information for notifying the reset of the messenger server (step 804). When the synchronization server recognizes the messenger server reset information, the synchronization server reflects the information indicating that no user is currently online in the online user database (step 806).

INDUSTRIAL APPLICABILITY

According to the exemplary embodiments of the invention described above, it is possible to notify events occurring in a variety of services by the use of a messenger while minimizing a server load.

In addition, it is possible to minimize the amount of notification message packets by transmitting a notification message only to messenger online users.

While the invention has been described with reference to the exemplary embodiments, it can be understood by those skilled in the art that the invention can be variously modified and altered without departing from the spirit and scope of the invention described in the attached claims.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more."

What is claimed is:

1. A computing system comprising:
   a processor configured to receive status change information of a user from a service providing system comprising at least two of a mail service, a blog service, and an instant messaging service, the status change information comprising online/offline status of the user,
   wherein a field of a protocol packet comprising one or more fields of information is used to identify, by the processor, a packet type with respect to the online/offline status of the user of the service providing system; and
   a non-transitory storage medium is configured to store the status change information according to the identified packet type,
   and in response to determination of online/offline status of the user, the processor is configured to selectively transmit a notification message by converting the field of the one or more fields of information of the protocol packet into a protocol packet suitable for the respective at least two of the mail service, blog service, and instant messaging service.

2. The computing system of claim 1, wherein the processor is further configured to determine whether a user corresponding to the notification message is online based upon the status of the user, the status being stored in the non-transitory storage medium upon receipt of the notification message from the service providing system, and to transmit the notification message to the user if the user is detected as online.

3. The computing system of claim 1, wherein the service providing system is configured to monitor whether an event occurs and to create the notification message indicating the occurrence of the event occurs associated with the mail service, the blog service and the instant messaging service.

4. The computing system of claim 3, wherein the event comprises a mail reception event where the service providing system is the mail service system, and the event comprises a new text registration event where the service providing system is the blog service system or community service system.

5. The computing system of claim 1, further comprising:
   a messenger server configured to provide reset information, the messenger server to transmit the reset information to a synchronization server and, upon detection of receiving the reset information, the synchronization server to update the non-transitory storage medium.

6. The computing system of claim 5, wherein the synchronization server comprises a socket for communication with the messenger server and the protocol packet is transmitted using the socket.

7. The computing system of claim 5, wherein the synchronization server comprises:
   one or more sockets configured to communicate with the messenger server and the servers of the service providing system, wherein the sockets comprise a first socket to communicate with the servers of the service providing system and a second socket to communicate with the messenger server;

a status information updating module configured to update status information stored in the non-transitory storage medium upon receipt of the status change information of the user; and an online user determination module configured to determine whether the user is online, wherein the second socket is configured to receive the status change information of the user and to provide the received status change information to the status information updating module, and wherein the first socket is configured to receive the notification message from the external service system and the second socket is configured to provide the notification service if the online user determination module determines that the user of the notification message is online.

8. The computing system of claim 7, wherein the first socket comprises a listener configured to receive a notification message associated with the mail service, the blog service and the instant messaging system from the service providing system;

a reader configured to read the field information of the protocol packet; and a handler configured to provide the status change information according to the filed information read by the reader.

9. The computing system of claim 7, wherein the second socket comprises:

a listener configured to receive the status change information of the user from the messenger server;

a reader configured to read information received by the listener;

a handler configured to provide the status change information of the user read by the reader to the status information updating module; and a writer configured to transmit the notification service provided from the first socket or the online user determination module to the messenger server.

10. The computing system of claim 7, wherein the second socket comprises a messenger server socket to receive and to process status change information of the user provided from the messenger server and a message notification server socket configured to receive and to process a messenger user's offline status information from a message notification server of the service providing system.

11. The computing system of claim 1, wherein the fields information comprises a packet code field, a command field, a session ID field, a packet ID field, and a body field.

12. The computing system of claim 11, wherein the packet code field comprises a transmission method to identify a unicast, a multicast and a broadcast.

13. The computing system of claim 1, wherein the converting the fields information comprises converting a parameter corresponding to the command field into a parameter suitable for the respective external service providing systems.

14. A method for providing a notification service, the method comprising:

receiving, by a synchronization server, status change information of a user from a service providing system comprising at least two of a mail service, a blog service, and an instant messaging service, the status change information comprising online/offline status of the user, wherein a field of a protocol packet comprising one or more fields of information is used to identify a packet type with respect to the online/offline status of the user of the service providing system, and wherein a non-transitory storage medium, coupled to the synchronization server, is configured to store the status change information according to the identified packet type; and in response to a determination of online/offline status of the user, selectively transmitting a notification message by converting the field of the one or more fields of information of the protocol packet into a protocol packet suitable for the respective at least two of the mail service, blog service, and instant messaging service according to the determination.

15. The method of claim 14, wherein selectively transmitting comprising:

receiving a notification message corresponding to the status change information from the service providing system in response to detection of event associated with the mail service, the blog service and the instant messaging service;

determining whether a user corresponding to the notification message is online based upon information stored in the non-transitory storage medium; and transmitting the notification message to the service providing system if the user associated with the notification message is determined as online.

16. The method of claim 15, further comprising:

converting the fields information of the protocol packet associated with the notification message into parameters suitable for performing by the service providing system.

17. A system using a synchronization server for notifying an event of an service providing system comprising at least two of a mail service system, a blog service system, and a messenger service system, the system comprising:

one or more sockets of the synchronization server configured for communications with the service providing system, the sockets comprising a first socket and a second socket, wherein the first socket, executed by a processor, is configured to communicate with one or more servers associated with the service providing system and the second socket, executed by the processor, is configured to communicate with a messenger server of the messenger service system;

a status information updating module, executed by the processor, configured to update user status change information stored in a non-transitory storage medium, in response to receipt of the status change information of a messenger user from the messenger service system, wherein the status change information comprises online/offline status of the messenger user, and a field of a protocol packet comprising one or more fields of information is used to identify a packet type with respect to the online/offline status of the user; and an online user determination module, executed by the processor, configured to determine whether a user associated with a notification message is online according to the identified packet type, and in response to determination of online/offline status of the user, the synchronization server selectively to transmit a notification message by converting the field of the one or more fields of information of the protocol packet into a protocol packet suitable for the respective at least two of the mail service, blog service, and instant messaging service according to the determination.

18. The system of claim 17, wherein the second socket is configured to receive the status information from the messenger service providing system, and wherein the first socket is configured to receive the notification message of the service providing system and the second socket is configured to provide notification information associated with the messenger service system if the online user determination module determines that the user associated with the notification message is online.

19. A method for providing a notification service, the method comprising:
provide a presence status of a user associated with a server with respect to at least two of a mail service, a blog service, and an instant messaging service, wherein the presence status comprises online/offline status of the user, wherein a field of a protocol packet comprising one or more fields of information is used to identify a packet type with respect to the online/offline status of the user;
transmitting the presence status of the user to a synchronization server, wherein the transmitted presence status of the user is stored in a non-transitory storage medium according to the identified packet type, and the non-transitory storage medium being coupled to the synchronization server, wherein
in response to determination of online/offline status of the user, selectively transmitting a notification message associated with the presence status of the user by converting the field of the one or more fields of information of the protocol packet into a protocol packet suitable for the respective at least two of the mail service, blog service, and instant messaging service according to the determination.

* * * * *